(12) United States Patent
Chen

(10) Patent No.: US 8,852,749 B2
(45) Date of Patent: *Oct. 7, 2014

(54) COMPOSITIONS AND STRUCTURES HAVING TAILORED WATER VAPOR TRANSMISSION

(75) Inventor: John Chu Chen, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 1738 days.

This patent is subject to a terminal disclaimer.

(21) Appl. No.: 12/029,116

(22) Filed: Feb. 11, 2008

(65) Prior Publication Data

US 2009/0202852 A1    Aug. 13, 2009

(51) Int. Cl.
    *B32B 27/06*      (2006.01)
    *B32B 27/12*      (2006.01)
    *C08L 23/10*      (2006.01)
    *C08L 23/08*      (2006.01)
    *C08K 5/09*      (2006.01)
    *C08K 5/098*      (2006.01)

(52) U.S. Cl.
CPC .......... *C08L 23/0876* (2013.01); *C08L 23/0869* (2013.01); *C08L 23/0853* (2013.01); *C08K 5/09* (2013.01); *C08L 2205/02* (2013.01); *C08L 23/10* (2013.01); *C08K 5/098* (2013.01)
USPC ............... 428/522; 428/292.1; 428/318.4; 428/319.7; 428/500; 428/523; 52/309.1

(58) Field of Classification Search
None
See application file for complete search history.

(56) References Cited

U.S. PATENT DOCUMENTS

| | | | |
|---|---|---|---|
| 6,645,336 B1 | 11/2003 | Albertone | |
| 6,808,772 B2 | 10/2004 | Kunzel | |
| 6,878,455 B2 | 4/2005 | Kunzel | |
| 6,890,666 B2 | 5/2005 | Kunzel | |
| 7,008,890 B1 | 3/2006 | Kunzel | |
| 7,285,324 B1 | 10/2007 | Albertone | |
| 7,442,659 B2 * | 10/2008 | Moll | 442/394 |
| 7,829,197 B2 * | 11/2010 | Chen et al. | 428/511 |
| 7,838,104 B2 * | 11/2010 | Chen et al. | 428/292.4 |
| 7,838,123 B2 * | 11/2010 | Chen et al. | 428/511 |
| 2003/0198715 A1 | 10/2003 | Morris et al. | |
| 2003/0215609 A1 | 11/2003 | Burkart | |
| 2004/0103603 A1 | 6/2004 | Kunzel | |
| 2004/0103604 A1 | 6/2004 | Kunzel | |
| 2004/0103605 A1 | 6/2004 | Kunzel | |
| 2004/0103607 A1 | 6/2004 | Kunzel | |
| 2004/0245391 A1 | 12/2004 | Kunzel | |
| 2005/0124741 A1 * | 6/2005 | Chen | 524/300 |
| 2007/0078223 A1 * | 4/2007 | Chen et al. | 525/191 |
| 2007/0283652 A1 | 12/2007 | Chen et al. | |
| 2007/0287019 A1 | 12/2007 | Chen et al. | |

FOREIGN PATENT DOCUMENTS

| | | |
|---|---|---|
| WO | WO 96/33321 A1 | 10/1996 |
| WO | WO 03/042037 A1 | 5/2003 |
| WO | WO 03/044294 A1 | 5/2003 |
| WO | 2004/043155 A2 | 5/2004 |
| WO | 2005/056669 A1 | 6/2005 |
| WO | 2008/082624 A2 | 7/2008 |

\* cited by examiner

*Primary Examiner* — Monique Jackson

(57) ABSTRACT

Disclosed is a variable vapor barrier comprising or produced from a composition wherein the composition comprises an ethylene copolymer, a fatty acid, and an additional polymer; the ethylene copolymer comprises repeat units derived from ethylene, a $C_{3-8}$ α,β-ethylenically unsaturated carboxylic acid, and optionally a comonomer; the fatty acid is one or more carboxylic acids having fewer than 36 carbon atoms, or salts thereof; and the additional polymer is present in the from about 30 to about 85%, based on the weight of the composition.

19 Claims, No Drawings

COMPOSITIONS AND STRUCTURES HAVING TAILORED WATER VAPOR TRANSMISSION

This invention relates to a composition and variable vapor or moisture barrier having variable moisture permeance under different ambient humidity conditions.

BACKGROUND OF THE INVENTION

Confined spaces such as building interiors and packaging may have limited exchange of moisture vapor with adjacent or external environmental spaces. Materials having moisture permeance that is variable when exposed to different ambient conditions can provide benefits in such fields as construction or packaging. Buildings are commonly equipped with thermal insulation in order to provide comfortable living conditions inside the building. In addition to insulation, buildings are also constructed with various air barrier materials that are installed between the sheathing and the exterior cladding to limit air and water infiltration into the structure of the building. These air barriers minimize heat loss through draft flow.

Building liner material that has a water vapor diffusion resistance of from 2 to 5 meters diffusion-equivalent air space width at a relative humidity of an atmosphere surrounding the vapor barrier between 30% and 50% has been disclosed. See, e.g., U.S. Pat. No. 6,808,772, U.S. Pat. No. 6,878,455, U.S. Pat. No. 6,890,666, US 2003/0215609, and WO2002/070351.

In addition to air barriers, vapor barriers are also used for controlling flow of moisture. For example, the moisture flow is generally from inside to outside when the exterior air is cold and dry (winter) and from outside to inside when the air is hot and humid (summer). In regions where these conditions prevail, it is common practice to use a vapor barrier such as polyethylene (PE) film on the warm side of the insulation, generally behind the gypsum wallboard, to prevent moisture diffusion from the interior heated space to the exterior cold environment. Such vapor barriers reduce the potential for moisture condensation in the interior wall cavity space as the water vapor is exposed to the cold exterior temperatures. Moisture condensation causes wood decay, promotes mold growth, reduces insulation value, and consequently must be eliminated whenever practical.

Although the use of PE film as a vapor barrier reduces moisture condensation during exterior conditions of cold temperatures and low humidity, the same vapor barrier increases the likelihood of moisture condensation at the insulation-PE film interface during hot and humid exterior conditions where moisture flow is from outside to inside. Therefore, it is desirable to have a material that acts as a vapor barrier during winter but facilitates vapor permeation during hot, humid summer conditions. It is also desirable to have a vapor barrier that can become vapor permeable under humid conditions in the wall cavity caused by unexpected uncontrolled events like water leaks into the wall cavity, to facilitate drying of the wall cavity by inward moisture flow as well as outward flow.

SUMMARY OF THE INVENTION

A composition comprises, consists essentially of, consists of, or is produced from, an ethylene acid copolymer or an ionomer thereof or combinations thereof, a fatty acid, and an additional polymer wherein the ethylene acid copolymer comprises polymer units derived from ethylene, a $C_{3-8}$ α,β-ethylenically unsaturated carboxylic acid, and optionally a comonomer, which can include or be selected from alkyl (meth)acrylate, carbon monoxide, sulfur dioxide, acrylonitrile, maleic anhydride, dimethyl maleate, diethyl maleate, dibutyl maleate, dimethyl fumarate, diethyl fumarate, dibutyl fumarate, dimenthyl fumarate, glycidyl acrylate, glycidyl methacrylate, and glycidyl vinyl ether, where the ester can be one or more $C_1$ to $C_4$ alcohols (e.g., methyl, ethyl, n-propyl, isopropyl and n-butyl alcohols), or combinations of two or more thereof;

the fatty acid contains fewer than 36 carbon atoms, or salts thereof;

the additional polymer can include or be selected from the group consisting of ethylene-containing polymers or propylene-containing polymers, or combinations of two or more thereof.

DETAILED DESCRIPTION OF THE INVENTION

The composition optionally has a ratio of wet cup permeance to dry cup permeance greater than 3, greater than 10, or greater than 20, alternatively greater than 50, alternatively greater than 75, when measured according to ASTM E 96-00 at a temperature of 73° F. (23° C.), wherein wet cup permeance is determined at an average relative humidity of 75% and dry cup permeance is determined at an average relative humidity of 25%. The composition may be a variable vapor barrier which may be in the form of a film.

The variable water vapor barrier may have a water vapor transmission rate (WVTR) measured for a film of 2 mil (0.0504 mm) in thickness according to ASTM E96 of less than about 225 g/m²/24 hours, or < about 150 g/m²/24 hours, or < about 125 g/m²/24 hours, or < about 100 g/m²/24 hours or a permeance of less than about $1.86 \times 10^{-6}$ g/Pa/second/m², or < about $1.24 \times 10^{-6}$ g/Pa/second/m², or < about $1.03 \times 10^{-6}$ g/Pa/second/m² or less than $8.27 \times 10^{-7}$ g/Pa/second/m², or both, when measured at 23° C. and 75% relative humidity.

Permeance is a measure of the permeability of a material to water vapor divided by its thickness in inches and can be expressed in units of Perms (grains/h·ft²·inches of Hg or $5.72 \times 10^{-8}$ g/Pa/second/m²) (a grain equals to 0.0648 grams). The permeance of still air is 120 perms·inch (see Table 5.4, Page 158, *Thermal and Moisture Protection Manual*, Christine Beall, McGraw-Hill). Another measure of permeability is WVDS ($S_d$), which can be expressed in meters diffusion-equivalent air layer thickness. These measures can be related by the expression $$3.048/S_d = \text{Permeance in Perms}.$$

For illustration, the diffusion resistance expressed as $S_d$ of prior vapor barrier materials has been converted to permeance expressed in Perms and summarized below:

| Reference | Permeance (Perms) | |
|---|---|---|
| U.S. Pat. No. 6,808,772 | 0.61 to 1.52 at 30 to 50% RH | Greater than 3.1 at 60 to 80% RH |
| US2003/0215609 | — | 0.03 to 6.09 at 60 to 80% RH |
| WO2002/070351 | 0.15 to 3 at 25% RH | 4.35 to 152 at 72.5% RH |

Many previous permeable membranes are microporous; that is, they are permeable due to the presence of microscopic pores through which vapor can pass. The composition disclosed herein can be formed into a monolithic membrane that functions as a selectively permeable barrier. Monolithic membranes, in contrast to microporous membranes, have high water-entry pressure and are waterproof and liquid proof and can provide good barriers to liquid water while still allowing permeability to water vapor under appropriate conditions. Monolithic membranes are also excellent in stopping draft flow to help minimize heat loss. A monolithic membrane can also function as a barrier to odors and possess better tear strength compared to microporous membranes.

The $C_{3-8}$ α,β-ethylenically unsaturated carboxylic acid can include (meth)acrylic acid (free acid or completely or partially neutralized), maleic acid, maleic acid monoesters, itaconic acid, fumaric acid, fumaric acid monoester, a salt of these acids, or combinations of two or more thereof where (meth)acrylic acid is acrylic acid, methacrylic acid, or both.

A popular optional comonomer is an alkyl (meth)acrylate including alkyl acrylate, alkyl methacrylate, or combinations thereof wherein the alkyl groups have from 1 to 8, or 1 to 4, carbon atoms Ethylene acid copolymers can be produced by any methods known to one skilled in the art such as use of "co-solvent technology" disclosed in U.S. Pat. No. 5,028,674 or by employing somewhat higher pressures than those at which copolymers with lower acid levels can be prepared.

Examples of ethylene acid copolymer include copolymer of ethylene and acrylic acid, copolymer of ethylene, acrylic acid, and n-butyl acrylate, copolymer of ethylene, acrylic acid, and iso-butyl acrylate, copolymer of ethylene and (meth)acrylic acid, copolymer of ethylene, (meth)acrylic acid, and n-butyl(meth)acrylate, copolymer of ethylene, (meth)acrylic acid, methyl(meth)acrylate, copolymer of ethylene, (meth)acrylic acid, ethyl(meth)acrylate, copolymer of ethylene and maleic acid, copolymer of ethylene, maleic acid monoester, copolymer of ethylene, maleic acid monoester, and n-butyl(meth)acrylate, copolymer of ethylene, maleic acid monoester, and methyl(meth)acrylate, copolymer of ethylene, maleic acid monoester, and ethyl(meth)acrylate, or combinations of two or more thereof. Such copolymers are readily available commercially such as Nucrel® from E. I. du Pont de Nemours and Company (DuPont).

The acid copolymers described can be used to produce ionomers by treatment with a metal compound to any level such as about 15 to about 90% or about 40 to about 75% of the acid moieties. Commercially available ionomers include Surlyn® available from DuPont.

Metal compounds can include compounds of alkali metals, such as lithium, sodium or potassium, or combinations of such cations including formates, acetates, nitrates, carbonates, hydrogencarbonates, oxides, hydroxides or alkoxides of the ions of alkali metals, especially sodium and potassium, and formates, acetates, nitrates, oxides, hydroxides or alkoxides of the ions of alkaline earth metals and transition metals.

Fatty acids include $C_4$ to less than $C_{36}$ (such as $C_{34}$, $C_{4-26}$, $C_{6-22}$, or $C_{12-22}$) or salts thereof and can be present in the composition from about 1 to about 50 weight %. The acids may be substituted with substituents independently selected from the group consisting of $C_1$-$C_8$ alkyl, OH, and $OR^1$ in which each $R^1$ is independently $C_1$-$C_8$ alkyl, $C_1$-$C_6$ alkoxyalkyl or $COR^2$; and each $R^2$ is independently H or $C_1$-$C_8$ alkyl.

Examples of fatty acids include, but are not limited to, caproic acid, caprylic acid, capric acid, lauric acid, palmitic acid, stearic acid, isostearic acid, behenic acid, erucic acid, oleic acid, linoleic acid, isostearic acid, 12-hydroxystearic acid, or combinations of two or more thereof.

Salts of any of these fatty acids may comprise one or more alkali metal salts, including sodium, potassium salts, or both. Small amounts of salts of alkaline earth metal and/or or transition metal ions may be present in addition to alkali metal salts.

The fatty acids or salts thereof can be present in a range of about 2 to about 50 (alternatively, about 4 to about 40, about 4 to 30, about 4 to 20, or about 4 to 15) parts per hundred (pph) by weight of the ethylene copolymer or ionomer thereof.

Greater than 40%, 50%, 60%, 70%, 80% or 90% (or even 100%) acidic groups in the ethylene copolymer and fatty acid can be nominally neutralized with metal ions; and the metal ions present in the mixture can comprise at least 30, 40, 50, 60, 70 or 80 mole % sodium or potassium ions and the preponderance of the other metal ions are alkali metal ions. At 100% nominal neutralization (i.e., sufficient metal compound is added such that all acid moieties in the copolymer and fatty acid are nominally neutralized) higher fatty acid content, such as ≥20%, would be needed to maintain melt processability.

The composition comprises from about 30 to about 70, about 30 to about 60, about 35 to about 60, about 40 to about 55, about 40 to about 50 weight %, or about 50 weight %, based on the composition, of one or more additional polymer.

The additional polymer can include PE (homopolymers or copolymers), polypropylene (PP) (homopolymers or copolymers), or combinations of two or more thereof.

PE homopolymers and copolymers can be prepared by a variety of methods including Ziegler-Natta catalyst polymerization, metallocene catalyzed polymerization, Versipol® catalyzed polymerization or by free radical polymerization. The polymerization can be conducted as solution phase processes, gas phase processes, and the like. Examples of PE polymers can include high density PE, linear low density PE, low density PE, very low or ultralow density polyethylenes, lower density PE made with metallocene having high flexibility and low crystallinity.

The densities of polyethylenes suitable can range from about 0.865 g/cc to about 0.970 g/cc. Linear polyethylenes can incorporate α-olefin comonomers such as butene, hexene or octene to decrease density to within the density range so described. For example, a copolymer used may comprise a major portion (by weight) of ethylene that is copolymerized with another α-olefin having about 3 to about 20 carbon atoms and up to about 20% by weight of the copolymer. Other α-olefins are propylene, 1-butene, 1-hexene, 4-methyl-1-pentene, 1-octene, 1-decene, 1-tetradecene, 1-octadecene, or in admixtures of two or more.

The PE copolymer may also be an ethylene propylene copolymer an elastomer (EPDM) containing a small amount of unsaturated compounds having a double bond or a diolefin component such as butadiene, norbornadiene, hexadiene, or isoprene and ethylene/propylene/diene monomer.

PE copolymer may also include an ethylene copolymers comprising units derived from ethylene with at least one polar monomer such as vinyl acetate, alkyl(meth)acrylic ester, CO, maleic anhydride, maleic acid mono-ester, vinyl alcohol, and (meth)acrylic acid, or combinations of two or more thereof. Examples of PE copolymer include Elvax® (ethylene vinyl acetate copolymer) and Evaloy® (ethylene alkyl(meth) acrylic copolymer) available from DuPont.

The amount of the vinyl acetate comonomer incorporated into ethylene vinyl acetate copolymers can be from about 1 to about 45, about 2 to about 45, or about 5 to about 30, weight % of the total copolymer. The ethylene/vinyl acetate copolymer may additionally be modified by methods well known in the art, including modification with an unsaturated carboxylic acid or its derivatives, such as maleic anhydride or maleic acid. The ethylene/vinyl acetate copolymer may have a melt flow rate, measured in accordance with ASTM D-1238, of from 0.1 to 60 g/10 minutes or 0.3 to 30 g/10 minutes, or 0.5 to 15 g/10 minutes. A mixture of two or more different ethylene/vinyl acetate copolymers can be used.

Ethylene alkyl(meth)acrylate copolymer includes copolymers of ethylene and one or more $C_{1-8}$ alkyl(meth)acrylates. Examples of alkyl(meth)acrylates include methyl acrylate, ethyl acrylate and butyl acrylate. Examples of the copolymers include ethylene/methyl acrylate copolymer ethylene/ethyl acrylate copolymer, ethylene/butyl acrylate copolymer, or combinations of two or more thereof. An ethylene/alkyl (meth)acrylate copolymer may comprise about 2 to about 45, 5 to 45, 10 to 35, or 10 to 28, weight % of alkyl acrylate where the alkyl group is methyl, ethyl, iso-butyl, or n-butyl.

Ethylene alkyl(meth)acrylate copolymers can be prepared by processes well known to one skilled in the art using either autoclave or tubular reactors. See, e.g., U.S. Pat. No. 2,897,183, U.S. Pat. No. 3,404,134, U.S. Pat. No. 5,028,674, U.S. Pat. No. 6,500,888, and U.S. Pat. No. 651,865.

PE copolymer or PP copolymer may include a polymer comprising units derived from unsaturated dicarboxylic acid monoester or anhydride such as maleic anhydride, citraconic anhydride, itaconic anhydride, tetrahydrophthalic anhydride, maleic acid monoester, citraconic maleic acid monoester, itaconic maleic acid monoester, or combinations of two or more thereof. The modified copolymer can be obtained by any known techniques, such as a process in which a polymer selected from a PE homopolymer or copolymer, a polypropylene homopolymer or copolymer, an ethylene/vinyl acetate copolymer or an ethylene/alkyl acrylate copolymer, as disclosed above, is dissolved in an organic solvent with an unsaturated dicarboxylic acid anhydride or its functional equivalent and a radical generator, followed by heating with stirring; and a process in which all the components are fed to an extruder to provide a maleic-anhydride grafted ethylene copolymer. The modified copolymer can also be obtained by copolymerization of olefin, vinyl acetate, alkyl(met)acrylate, or combinations of two or more thereof and the unsaturated dicarboxylic acid monoester or anhydride (e.g., a high-pressure free radical process, in which an olefin comonomer and a functional comonomer are directly copolymerized such as disclosed in in U.S. Pat. No. 4,351,931). These modified copolymers can comprise about 0.1 to about 15, about 0.1 to about 5, or about 0.1 to about 3, weight % of the unsaturated dicarboxylic acid monoester or anhydride. These copolymers are available commercially from DuPont as Fusabond® or Bynel®.

Polypropylene polymers include homopolymers, random copolymers, block copolymers and terpolymers of propylene. Copolymers of propylene include copolymers of propylene with other olefins such as ethylene, 1-butene, 2-butene and the various pentene isomers, etc. and preferably copolymers of propylene with ethylene. Terpolymers of propylene include copolymers of propylene with ethylene and one other olefin. Random copolymers, also known as statistical copolymers, are polymers in which the propylene and the comonomer(s) are randomly distributed throughout the polymeric chain in ratios corresponding to the feed ratio of the propylene to the comonomer(s). Block copolymers are made up of chain segments consisting of propylene homopolymer and of chain segments consisting of, for example, random copolymers of propylene and ethylene.

The composition can be produced by any means known to one skilled in the art. It is substantially melt-processable and can be produced by combining one or more ethylene acid copolymers or ionomers of the ethylene acid copolymers, one or more fatty acids or salts thereof, a basic metal compound, and one or more additional polymer to produce a mixture; heating the mixture under a condition sufficient to produce the composition. Heating can be carried out under a temperature in the range of from about 80 to about 350 or 120 to 300° C. or 160 to 260 C under a pressure that accommodates the temperature for a period from about 30 seconds to about 2 or 3 hours. The composition can be produced by melt-blending an ethylene acid copolymer and/or ionomer thereof with one or more fatty acids or salts thereof; concurrently or subsequently combining a sufficient amount of a basic metal compound; and optionally, combining an additional polymer disclosed above. A salt blend of components can be made or the components can be melt-blended in an extruder. For example, a Werner & Pfleiderer twin-screw extruder can be used to mix and treat the ethylene acid copolymer and the organic acid (or salt) with the metal compound at the same time.

The composition can additionally comprise small amounts of additives including plasticizers, stabilizers including viscosity stabilizers, hydrolytic stabilizers, primary and secondary antioxidants, ultraviolet light absorbers, anti-static agents, dyes, pigments or other coloring agents, inorganic fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof. Inorgamic fillers, such as calcium carbonate, and the like can also be incorporated into the composition.

These additives may be present in the compositions in quantities ranging from 0.01 to 40, 0.01 to 25, 0.01 to 15, 0.01 to 10, or 0.01 to 5, weight %. The incorporation of the additives can be carried out by any known process such as, for example, by dry blending, by extruding a mixture of the various constituents, by the conventional masterbatch technique, or the like.

The variable vapor barrier, or humidity-adaptive smart vapor barrier, can be used as an essential material that has a permeance or water vapor diffusion, which is dependent on the ambient humidity and which has sufficient strength and toughness for use in buildings as they are being built or renovated. In the case of an average humidity in the range below 50%, such as from 10 to 40%, or from 15 to 35%, of the atmosphere surrounding the variable vapor barrier, the material used for the variable vapor barrier, in the form of a film or as a coating or laminate on a carrier material, can have a moisture permeance of less than 0.5 perms, or less than 0.75 perm, or less than 1.0 perm. The material can also have a moisture permeance greater than 3, or 5 or 10 perms in the case of an average humidity in the range above 60%, such as from 60 to 90% or 65 to 85%, as is typical for the summer months.

This humidity-dependent behavior leads to a lower permeance being achieved under winter conditions than under summer conditions. In this way, the variable vapor barrier material is effective in preventing moisture from diffusing from the interior of the building into the wall cavity and condensing into liquid water under winter conditions. Under summer conditions, such as high exterior humidity, the humidity-dependent behavior of the material provides moisture flow out of the wall cavity in both directions (particularly into the air-conditioned interior of the building) when needed, to facilitate a drying out process and to avoid water condensation in the wall cavity due to cooling by the building air conditioning. This behavior fosters peak insulation performance and reduces the risk of damage to building components due to excess moisture retention and condensation.

The variable vapor barrier may also be applied to a substrate to produce a carrier. For example, the variable vapor barrier may be applied as a coating or a laminate to the substrate. Alternatively, a film comprising the variable vapor barrier composition may be coated, laminated, or adhered to a substrate of the carrier. Substrate can be any materials providing support, shape, esthetic effect, protection, surface texture, bulk volume, weight, or combinations of two or more thereof to enhance the functionality and handability of variable vapor barrier composition.

The variable vapor barrier or with the carrier can be applied between the interior sheathing and the insulating material in a wall, ceiling and/or roof of a building.

The variable vapor barrier can be a film (or sheet) that can be applied as part of the wall, ceiling or roof construction of a building (e.g., the film or sheet may be applied separately or be attached to the framing members so that the film is between the insulating material and the interior sheathing).

The variable vapor barrier can also be part of a structural component of a house or building that has a carrier material for the variable vapor barrier composition.

For example, the variable vapor barrier, either in the form of a film or combined with a substrate, can be applied to a wall, ceiling or roof of a building between the interior sheathing material (such as gypsum wallboard) and the insulation. Articles comprising the composition and a substrate can be used to provide structural components that can be used in the construction or renovation of a building. The variable vapor barrier composition may be used as a surface for building panels or as a backing sheet or a face sheet for insulation. Also, films and structures prepared from the composition have sufficient strength and toughness for use in buildings as they are being built or renovated. When used as part of a building, the variable vapor barrier can be applied between the interior sheathing and the insulating material in a wall, ceiling and/or roof of a building.

Cellulose materials such as paper webs (for example Kraft paper), membranes made from synthetic fiber spun fabrics such as nonwoven textiles, or even perforated films having large percentages of open areas such as perforated PE films, may be used as materials for the carrier(s), for example. These substrates may be reinforced with fibers. Other examples of substrates include particle board, chip board, oriented strand board, plywood paneling, gypsum board (standard or fiber reinforced), fiber board, cement board, cementitious wood wool board, calcium silica board, fiber insulation batts or slabs, foam insulation slabs, cloth, or combinations of two or more thereof. The variable vapor barrier itself may be applied to any of these substrate as a film or membrane or laminate or as a coating (via extrusion coating, spraying, painting or other appropriate application methods).

A variable vapor barrier can include at least one layer of carrier (or substrate) material which is a thermal insulation selected from the group consisting of fiber insulation batts, fiber insulation slabs, foam insulation slabs, or combinations of two or more thereof. The layer can also be gypsum board, a cellulose material such as Kraft paper, a nonwoven textile, or combinations of two or more thereof.

For example, the variable vapor barrier material is applied to a carrier as a film, a coating or a laminated layer. The coating or laminate can be applied to one side or both sides of the carrier or substrate. It can also be accommodated between two layers of the carrier or substrate in a sandwich-like manner. The coating or laminate material may be effectively protected from both sides from mechanical wear and it can therefore ensure the desired water vapor diffusion properties over an extended period of time. To avoid hindering drying, the carrier or substrate may be such that the carrier or at least one layer thereof has a water vapor diffusion that is greater than the water vapor diffusion of the variable vapor barrier material so that the water vapor diffusion characteristics of the structure are essentially provided by the variable vapor barrier material. Several such layer assemblies can also be assembled one above the other.

The substrate or carrier may be coated or laminated on one side where the coating or laminate can be applied to the side on which little or no protection is required against mechanical influences. The installation of the variable vapor barrier can take place in such a way in this case that the protective carrier material points toward the side facing the room.

The variable vapor barrier material may be applied to a paper web by, for example but not limitation, extrusion coating. For example, extrusion coating the variable vapor barrier material onto paper can be done as follows. Dried granulates of the blend (and granulates of compositions for other layers, if present) are melted in an extruder. The molten polymer(s) may be passed through a flat die to form a molten polymer curtain wherein the compositions of the individual layers are present in a laminar flow. The molten curtain drops onto the moving paper substrate to be immediately pressed into that substrate and quenched by a quench drum.

The variable vapor barrier material may also be applied as a face film or sheet to an insulation material including use of blankets, loose-fill, or rigid systems with materials such as rock wool, fiber glass, cellulose, polyurethane foam, extruded polystyrene foam, expanded polystyrene foam, polyurethane foam, polyisocyanurate foam, or combinations of two or more thereof. Such insulating material makes a building more energy efficient and acts as a sound absorber or barrier, keeping noise levels down.

A film of the variable vapor barrier material can also be laminated to a paper web by means of an inner layer applied in molten form to adhere the film to the substrate. The process involves laying down a molten curtain of the inner layer composition between the film and the substrate moving at high speeds as they come into contact with a cold (chill) roll. The melt curtain is formed by extruding the inner layer composition through a flat die.

Use of paper coated with the variable vapor barrier material is particularly advantageous for production of building materials in continuous processes wherein the coated paper is supplied as a continuous web and is incorporated as part of a multilayer structure. An example further comprises insulation batts or slabs, wherein the paper coated with the variable vapor barrier is a facing sheet for the insulation. The coated paper can also be applied as a backing sheet for a building panel comprising, for example but not limitation, particle board, chip board, oriented strand board, plywood paneling, gypsum board (standard or fiber reinforced), fiber board, cement board, cementitious wood wool board, or calcium silica board.

A fiberglass batt may also be encased in an envelope prepared from a variable vapor barrier film allowing for the installation of insulation and the variable vapor barrier, such as in between the framing members in a wall cavity.

The above disclosures show that installation of the variable vapor barrier and an additional building material, such as insulation or a building panel, can be done in a single operation.

The following Examples are presented to illustrate, but are not meant to be unduly limiting scope of the invention.

EXAMPLES

FAMI-Na-1 was copolymer of ethylene and methacrylic acid (19 wt % of the copolymer) containing behenic acid (5 wt % of the copolymer of ethylene and methacrylic acid) where 75% of the combined acid moiety was neutralized with sodium carbonate in the form of a master batch.

FAMI-Na-2 was copolymer of ethylene and methacrylic acid (19 wt % of the copolymer) containing Na stearate (4.5 wt % of the copolymer of ethylene and methacrylic acid) where 70% of the combined acid moiety was neutralized with sodium carbonate in the form of a master batch.

Elvax® 3150 was an ethylene vinyl acetate copolymer (EVA) containing 15 wt % vinyl acetate, and a melt index of 2.5 g/10 minutes, obtained from DuPont.

The materials were melt-blended in a twin-screw extruder at 20 lb/h (about 9 kg/h) throughput rate to provide compositions summarized in the table 1 below. The compositions were cast into films of 2 to 2.5 mils thickness via a 28 mm W&P twin screw extruder.

The moisture permeance was measured for each cast film using protocols according to ASTM E 96-00. Permeance was measured according to Procedure A, using an average relative humidity (RH) of 25%, 55%, and 75% at a temperature of 73° F. (23° C.).

The resulting data expressed as US Perm, Permeance, and water vapor transmission rate (WVTR; as g/m$^2$-day) are presented in the following Table 1 wherein runs (based on FAMI-Na-1) were carried out to determine the benefits of additional polymer present in the variable vapor barrier composition. In Table 1, WVTR was measured on monofilms of 2 mils in thickness according to ASTM E96, at 25% relative humidity (RH), 75% RH, and 55% RH,—US Perm (in $5.72 \times 10^{-8}$ g/Pa/second/m$^2$), Permeance (in g/Pa/sec/m$^2$) and WVTR (in g/m$^2$-day). Table 1 shows that increasing EVA content in the composition progressively decreased the perm value at the higher RH conditions, i.e., 55% and 75% RH, to enable easy tailoring of the smart vapor barrier performance to meet the performance target of different end-use applications, i.e. face sheet of the insulation material, requiring different degrees of permeance under higher RH conditions, such as 75% RH. Depending on the climate patterns of the regions and the end-use construction different smart vapor barrier performance would be needed to optimize the moisture management and cost balance.

TABLE 2[1]

| Run No. | | Comp 4 | Comp 5 | 5 | 6 |
|---|---|---|---|---|---|
| | | Weight % | | | |
| FAMI-Na-2 | | 100% | 80% | 60% | 40% |
| Elvax ®3150 | | 0 | 20% | 40% | 60% |
| | RH | | | | |
| US Perm | 25% | 0.26 | 0.28 | 0.34 | 0.62 |
| | 75% | 30.2 | 23.8 | 17.2 | 2.33 |
| Permeance | 25% | 1.45E−08 | 1.33E−08 | 1.47E−08 | 2.13E−08 |
| | 75% | 1.73E−06 | 1.36E−06 | 9.84E−07 | 1.33E−07 |
| WVTR | 25% | 1.76 | 1.62 | 1.78 | 2.58 |
| | 75% | 209.7 | 165.2 | 119.4 | 16.2 |

[1]See footnotes in table 1.

The invention claimed is:

1. An article comprising, sequentially, or produced from a construction panel, an insulation, and a film or sheet wherein
   the film or sheet is a surface layer having one of its surfaces free from any other layer;
   the film or sheet is coated, laminated, or adhered, to the insulation;
   the film or sheet comprises or is produced from an ethylene acid copolymer or an ionomer of the ethylene acid copolymer or combinations thereof, a fatty acid or its metal salt, and, based on the weight of the film or sheet, about 30 to about 70% of an additional polymer;
   the ethylene acid copolymer comprises units derived from ethylene, a $C_{3-8}$ α,β-ethylenically unsaturated carboxylic acid, and optionally a comonomer;
   the fatty acid has fewer than 36 carbon atoms;
   greater than 50% of the acid moiety in the film or sheet is neutralized with a metal ion comprising at least 50% alkali metal ions selected from the group consisting of sodium, potassium, or combinations thereof and the other metal ions are alkali metal ions; and
   the additional polymer is selected from the group consisting of ethylene/alkyl (meth)acrylate copolymer, ethylene vinyl acetate, low density polyethylene, linear low density polyethylene, metallocene polyethylene, and combinations of two or more thereof.

2. The article of claim 1 wherein the side of the insulation opposing the film or sheet is adjacent to the construction panel.

3. The article of claim 2 wherein
   the $C_{3-8}$ α,β-ethylenically unsaturated carboxylic acid is (meth)acrylic acid;

TABLE 1

| Run No. | | Comp 1 | Comp 2 | Comp 3 | 1 | 2 | 3 | 4 |
|---|---|---|---|---|---|---|---|---|
| | | Weight % | | | | | | |
| FAMI-Na-1 | | 100% | 90% | 80% | 70% | 60% | 50% | 40% |
| Elvax ®3150 | | 0 | 10% | 20% | 30% | 40% | 50% | 60% |
| | RH % | | | | | | | |
| US Perm[1] | 25%[2] | 0.25 | 0.23 | 0.26 | 0.38 | 0.39 | 0.44 | 0.57 |
| | 55%[2] | 26.3 | 23.5 | 20.1 | 16.5 | | | |
| | 75%[2] | 52.3 | 47 | 39.6 | 30.3 | 19.2 | 7.8 | 1.92 |
| Permeance | 25%[2] | 1.45E−08 | 1.33E−08 | 1.47E−08 | 2.13E−08 | 2.22E−0.8 | 2.49E−08 | 3.28E−08 |
| | 55%[2] | 1.50E−06 | 1.34E−06 | 1.15E−06 | 9.44E−07 | | | |
| | 75%[2] | 2.99E−06 | 2.69E−06 | 2.26E−06 | 1.73E−06 | 1.10E−06 | 4.47E−07 | 1.10E−07 |
| WVTR | 25%[2] | 1.76 | 1.62 | 1.78 | 2.58 | 2.69 | 3.03 | 3.98 |
| | 55%[2] | 328.6 | 293.1 | 251.8 | 206.2 | | | |
| | 75%[2] | 362.8 | 326.7 | 274.8 | 210.3 | 133 | 54.3 | 13.34 |

[1]The % denotes relative humidity at which the measurements were made.
[2]The % denotes relative humidity at which the measurements were made.

Table 1 shows that at 20 weight % or less of EVA included in the composition (comparative runs 1 to 3), the permeance and WVTR were higher than desired whereas the compositions comprising 30 weight % or higher (runs 4 to 7) showed desired permeance and WVTR. Separate runs were carried out using a different ionomer (FAMI-Na-2 disclosed above). The results are shown in Table 2 showing comparative runs 4-5 did not produce desired permeance and WVTR whereas the invention runs 5-6 showed desired permeance and WVTR.

the optional comonomer includes alkyl (meth)acrylate, carbon monoxide, sulfur dioxide, acrylonitrile, maleic anhydride, dimethyl maleate, diethyl maleate, dibutyl maleate, dimethyl fumarate, diethyl fumarate, dibutyl fumarate, dimethyl fumarate, glycidyl acrylate, glycidyl methacrylate, and glycidyl vinyl ether, where the ester can be one or more $C_1$ to $C_4$ alcohols (e.g., methyl, ethyl, n-propyl, isopropyl and n-butyl alcohols), or combinations of two or more thereof and the additional polymer is present in the film or sheet from about 30 to about 60%, by weight of the total film or sheet.

4. The article of claim 3 wherein the fatty acid is substituted with $OH^-$, $R^1$ group, or $OR^1$ group and each $R^1$ is independently $C_1$ to $C_8$ alkyl.

5. The article of claim 3 wherein the fatty acid is stearic acid, behenic acid, 12-hydroxystearic acid, isostearic acid or combination thereof.

6. The article of claim 3 wherein the additional polymer is present in the film or sheet from about 35 to about 60 weight %.

7. The article of claim 6 wherein the additional polymer is the ethylene vinyl acetate copolymer, the ethylene alkyl (meth)acrylate copolymer, or combinations thereof.

8. The article of claim 7 wherein greater than 70% or 80% of acidic moiety in the film or sheet is neutralized.

9. The article of claim 8 wherein the film or sheet comprises about 40 to about 50% of the additional polymer, which is ethylene/alkyl (meth)acrylate copolymer, ethylene vinyl acetate, low density polyethylene, linear low density polyethylene, metallocene polyethylene, or combination of two or more thereof.

10. The article of claim 9 wherein the additional polymer is the ethylene vinyl acetate.

11. The article of claim 10 wherein the insulation includes fiber insulation batt, fiber insulation slab, foam insulation slab, or combinations of two or more thereof.

12. A wall, ceiling, or roof comprising, sequentially, a construction panel, an insulation, and a variable vapor barrier wherein the variable vapor barrier faces away from the wall, ceiling, or roof and is a surface layer;

the variable vapor barrier comprises or is produced from an ethylene acid copolymer or an ionomer of the ethylene acid copolymer or combinations thereof, a fatty acid or its metal salt, and, based on the weight of the variable vapor barrier, about 30 to about 70% of an additional polymer;

the ethylene acid copolymer comprises units derived from ethylene, a $C_{3-8}$ α,β-ethylenically unsaturated carboxylic acid, and optionally a comonomer;

the fatty acid has fewer than 36 carbon atoms;

greater than 50% of the acid moiety in the variable vapor barrier is neutralized with a metal ion comprising at least 50% alkali metal ions selected from the group consisting of sodium, potassium, or combinations thereof and the other metal ions are alkali metal ions; and the additional polymer is selected from the group consisting of ethylene/alkyl (meth)acrylate copolymer, ethylene vinyl acetate, low density polyethylene, linear low density polyethylene, metallocene polyethylene, and combinations of two or more thereof.

13. The wall, ceiling, or roof of claim 12 wherein the variable vapor barrier is in the form of a film.

14. The wall, ceiling, or roof of claim 13 wherein the insulation is in direct contact with construction panel and the variable vapor barrier.

15. The article of claim 14 wherein the fatty acid is stearic acid, behenic acid, 12-hydroxystearic acid, isostearic acid or combination thereof.

16. The article of claim 15 wherein the additional polymer is present in the variable vapor barrier from about 35 to about 60 weight %.

17. The article of claim 16 wherein the variable vapor barrier consists essentially of or is produced from the ethylene acid copolymer or an ionomer of the ethylene acid copolymer or combinations thereof, a fatty acid or its metal salt, and the additional polymer wherein greater than 60% of the acid moiety in the composition is neutralized with metal ion; and the additional polymer is ethylene/alkyl (meth)acrylate copolymer, ethylene vinyl acetate, low density polyethylene, linear low density polyethylene, metallocene polyethylene, or combination of two or more thereof.

18. The article of claim 17 wherein greater than 70% or 80% of acidic moiety in the variable vapor barrier is neutralized.

19. The article of claim 18 wherein the additional polymer is the ethylene vinyl acetate.

* * * * *